United States Patent [19]

Bonekamp et al.

[11] Patent Number: 5,532,315
[45] Date of Patent: Jul. 2, 1996

[54] THERMOFORMABLE, CHEMICAL RESISTANT POLYMER BLENDS

[75] Inventors: Jeffrey E. Bonekamp, Midland, Mich.; Steven B. Swartzmiller, Newark, Ohio; Robert J. Donald, Midland, Mich.; Andre J. Uzee, Baton Rouge, La.

[73] Assignee: The Dow Chemical Company, Midland, Mich.

[21] Appl. No.: 429,398

[22] Filed: Apr. 26, 1995

Related U.S. Application Data

[60] Division of Ser. No. 275,568, Jul. 15, 1994, which is a continuation-in-part of Ser. No. 971,921, Dec. 18, 1992, Pat. No. 5,334,657, which is a continuation-in-part of Ser. No. 859,207, Mar. 27, 1992, abandoned, which is a continuation-in-part of Ser. No. 811,350, Dec. 20, 1991, abandoned.

[51] Int. Cl.$^6$ ............ C08L 23/06; C08L 23/14; C08L 25/06; C08L 53/02
[52] U.S. Cl. ............ 525/71; 525/86; 525/95; 525/98; 525/240; 525/241; 521/40; 521/40.5; 521/41; 521/47
[58] Field of Search ............ 525/71, 86, 240, 525/241, 95, 98; 521/40, 40.5, 41, 47

[56] References Cited

U.S. PATENT DOCUMENTS

| | | | |
|---|---|---|---|
| 3,149,182 | 9/1964 | Porter | 260/879 |
| 3,265,765 | 8/1966 | Holden et al. | 260/876 |
| 3,390,207 | 6/1968 | Moss et al. | 260/879 |
| 3,862,880 | 1/1975 | Feldman | 161/160 |
| 4,031,166 | 6/1977 | Bronstert et al. | 260/876 B |
| 4,188,432 | 2/1980 | Holden et al. | 428/35 |
| 4,197,377 | 4/1980 | Bohm et al. | 525/99 |
| 4,386,187 | 5/1983 | Grancio et al. | 525/96 |
| 4,386,188 | 5/1983 | Grancio et al. | 525/96 |
| 4,464,439 | 8/1984 | Castelein | 428/517 |
| 4,525,533 | 6/1985 | Bertrand et al. | 525/98 |
| 4,548,988 | 10/1985 | Castelein | 525/71 |
| 5,008,332 | 4/1991 | Sano et al. | 525/92 |
| 5,055,525 | 10/1991 | Henton et al. | 525/66 |
| 5,278,232 | 1/1994 | Seelert et al. | 525/71 |
| 5,334,657 | 8/1994 | Swartzmiller et al. | 525/71 |

FOREIGN PATENT DOCUMENTS

| | | |
|---|---|---|
| 0004685 | 10/1979 | European Pat. Off. |
| 0042153 | 12/1981 | European Pat. Off. |
| 0060524 | 8/1982 | European Pat. Off. |
| 0060525 | 8/1982 | European Pat. Off. |
| 0125227 | 11/1984 | European Pat. Off. |
| 0147089 | 7/1985 | European Pat. Off. |
| 0402340 | 12/1990 | European Pat. Off. |
| 0421359 | 4/1991 | European Pat. Off. |
| 2356694 | 12/1978 | France. |
| 48043031 | 6/1973 | Japan. |
| 49028637 | 3/1974 | Japan. |
| 81036534 | 9/1979 | Japan. |
| 55-116743 | 9/1980 | Japan. |
| 9313168 | 7/1993 | WIPO. |

OTHER PUBLICATIONS

J52141854-A (abstract only); Nov. 1974.
EP 0060526 (abstract only); Sep. 1982.

*Primary Examiner*—W. Robinson H. Clark

[57] ABSTRACT

The invention is a recycling process for forming a thermoformable polymer blend comprising:

A) from 9 to 90 parts by weight of a monovinylidene aromatic polymer or an impact modified monovinylidene aromatic polymer, comprising from 1 to 25 weight percent of a rubber and 75 to 99 weight percent of a monovinylidene aromatic polymer matrix having a weight average molecular weight ($M_w$) from 50,000 to 400,000, said weight percents being based on the total weight of said impact modified, monovinylidene aromatic polymer;

B) from 9 to 90 parts by weight on an olefin polymer, selected from the group consisting of homopolymers of ethylene or propylene and copolymers of ethylene with one or more $C_{4-8}$ alpha-olefins; and C) from 1 to 20 parts by weight of a compatibilizing polymer comprising a styrene-isoprene-styrene triblock copolymer having a weight average molecular weight of from about 50,000 to about 110,000 Daltons wherein the styrene contained in the styrene blocks is from about 25 to 50 weight percent of the total polymer and the sum of A), B) and C) is 100 parts.

18 Claims, 2 Drawing Sheets

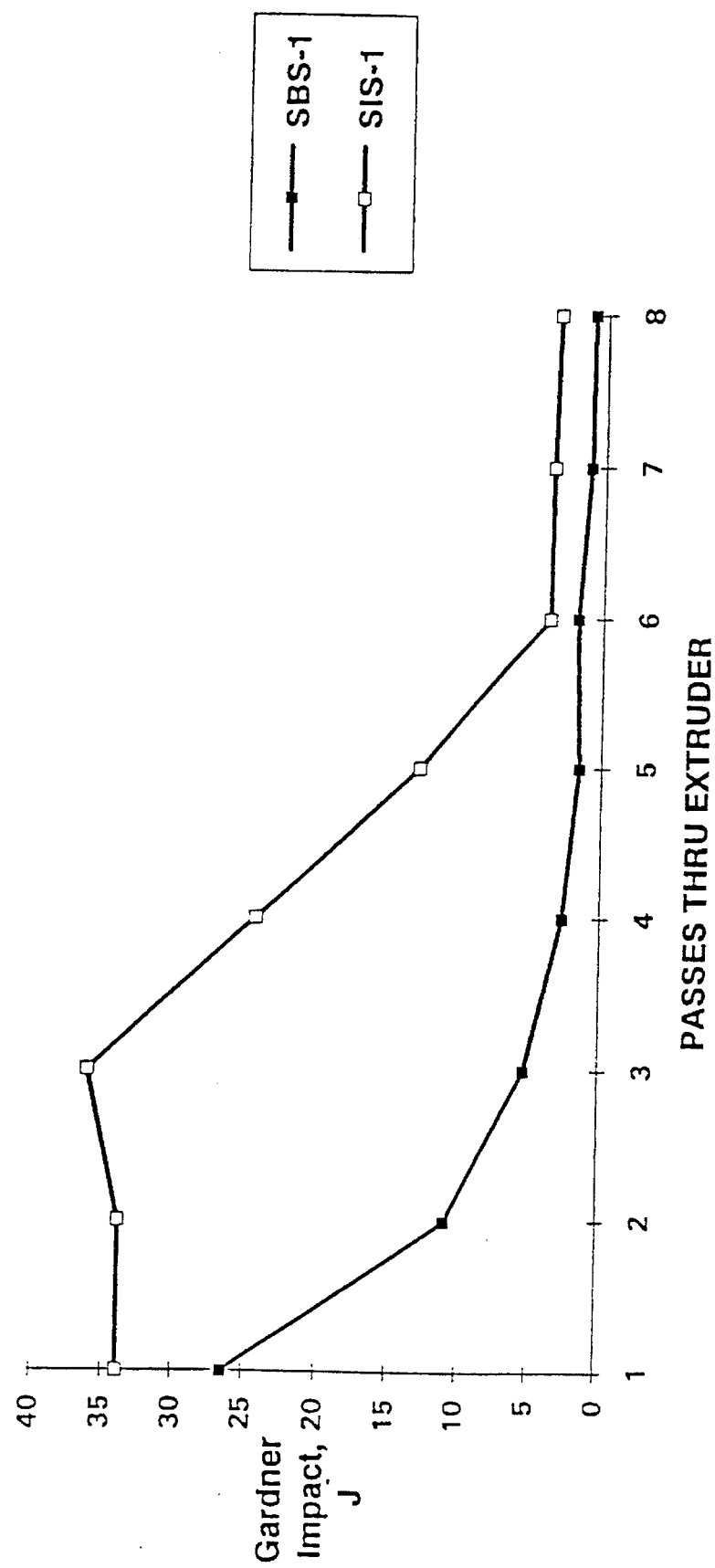

THERMOFORMABLE, CHEMICAL RESISTANT POLYMER BLENDS

CROSS-REFERENCE TO RELATED APPLICATIONS

This application is a divisional application of application Ser. No. 275,568, filed Jul. 15, 1994, which is a continuation-in-part of patent application Ser. No. 971,921 filed Dec. 18, 1992, now U.S. Patent No. 5,334,657, issued Aug. 2, 1994, incorporated herein by reference, which is a continuation-in-part of patent application Ser. No. 859,207, filed Mar. 27, 1992 (now abandoned), incorporated herein by reference, which is a continuation-in-part of patent application Ser. No. 811,350, filed Dec. 20, 1991 (now abandoned), incorporated herein by reference.

BACKGROUND OF INVENTION

The present invention relates to a thermoplastic resin composition having high resistance to attack by chemicals such as halogenated hydrocarbons and especially hydrochlorofluorocarbons (HCFC's), good thermoforming and film formation characteristics and good recycling capabilities. More particularly, the present invention relates to such a composition and to thermoformed objects therefrom.

It is previously known in the art to prepare thermoformable sheets from thermoplastic resins such as impact modified polystyrene (HIPS) and impact modified styrene acrylonitrile (ABS) resins. Such thermoformable resins have found wide use in the preparation of numerous objects such as containers, toys, and appliance components. In particular, refrigerator or freezer liners are often thermoformed from such a sheet material. In the manufacture of a typical refrigerator or freezer, such a liner is placed into an outer jacket formed of metal or similar material that forms the outer cabinet or door of the refrigerator or freezer, and the space between the outer jacket and the liner is filled with a thermosetting foam, usually polyurethane foam. Typically, polyurethane foams are prepared by blending a polyurethane forming mixture comprising a polyhydroxyl compound and a polyisocyanate compound with a suitable blowing agent and allowing the viscous liquid mixture to expand due to the effects of the blowing agent while the reaction to form the polyurethane takes place. By injecting the polyurethane forming mixture in the free space between the refrigerator or freezer liner and the outer jacket, and allowing the mixture to foam in place, a unitary structure is formed that greatly aids in the rigidity of the resulting refrigerator or freezer. Varying degrees of adhesion between the polyurethane foam and the liner may be obtained during the foaming process.

A number of chemicals are suitably employed as blowing agents, especially halogenated hydrocarbons, many of which are aggressive solvents for vinyl aromatic polymers. Recently, hydrochlorofluorocarbon (HCFC) and hydrofluorocarbon (HFC) blowing agents have been employed in a number of applications due to the reduced environmental degradation believed to result from releasing such blowing agents to the environment. Some HCFC and HFC blowing agents (also referred to as soft blowing agents) have been found to be highly aggressive solvents with respect to many thermoplastic resins, particularly styrene-containing resins, typically employed in thermoforming compositions. Due to this increased solubility, greater chemical attack of the thermoplastic resin can result if HCFC blowing agents come in contact with the surface of such thermoformable resin during the manufacturing process or while in use. This can lead to blistering and/or cracking of the thermoplastic resin due to the chemical attack at the point of contact with the thermoformed sheet.

Attempts to overcome such aggressive attack by compounds on typical thermoformable sheet materials have included use of an intervening barrier layer which may be coextruded or heat laminated to the thermoformable sheet material. Other solutions, such as coatings, similarly have not proven acceptable. Special resins which have improved resistance to the effects of HCFC's have also been attempted, but often such resins possess poor thermoformability, inadequate strength, inability to include reground scrap material from the manufacturing process, high cost or other unacceptable property.

For example, U.S. Pat. No. 4,386,187 discloses a resin blend having improved chemical resistance, however, it has now been discovered that such resins as are disclosed by this reference are not continuous in the vinylaromatic polymer phase and demonstrate poor thermoformability and insufficient flexural modulus and other physical properties for applications as a monolayer structure, such as refrigerator or freezer liners.

In many thermoplastic manufacturing processes, the use (recycling) of regrind or in-plant scrap is a routine part of the operation. Resin processors usually mix the regrind with virgin resin or use it by itself. No matter which discipline is followed, the regrind product sees several heat histories before it ends up in the finished article. In addition, with the efforts to recycle post-consumer plastic waste, these same resins that contain regrind product may be recycled and exposed to additional processing.

In ternary blends containing styrenic block copolymers with butadiene midblocks, repeated processing often leads to crosslinking which results in increased viscosities, processing difficulties and, ultimately, reductions in physical properties of the blend. The crosslinking is affected by the temperature of processing and limits the temperature at which the blends may be processed. In blends containing isoprene midblocks, chain scission, or depolymerization, predominates and the polymer tends toward reduced viscosities. The most common approach to address these potential changes is restabilization of the regrind product. To this end, manufacturers and resin producers have enjoyed only limited success in developing formulations which can withstand the heat histories of multiple exposures to melt processes.

Accordingly, it would be desirable if there were provided a thermoformable, thermoplastic resin having improved resistance to attack by halogenated hydrocarbons, especially hydrochlorofluorocarbons, which is capable of being processed and reprocessed (recycled) without loss of appearance, properties and/or physical properties.

What is needed is a thermoplastic polymer composition which can be recycled several times without deleteriously affecting the properties of products made from such polymer compositions. What is further needed is such a thermoplastic polymer composition which can be recycled without the need for additional or increased stabilizer levels. What is also needed is such a polymer composition wherein the processing conditions are not unnecessarily limited due to degradation of one component of the blend.

In addition, it would be desirable if there were provided a sheet material comprising such a thermoformable thermoplastic resin.

SUMMARY OF INVENTION

In one embodiment, the invention is a thermoformable blend which is readily recyclable several times without requiring significant changes in or unnecessary limitations to processing conditions. In this embodiment, the invention is a thermoformable polymer blend comprising:

A) from 9 to 90 parts by weight, preferably 15 to 75 parts, of (i) a monovinylidene aromatic polymer having a weight average molecular weight ($M_w$) from 50,000 to 400,000 or (ii) an impact modified monovinylidene aromatic polymer, comprising from 1 to 25 weight percent of a rubber and 75 to 99 weight percent of a monovinylidene aromatic polymer matrix having a weight average molecular weight ($M_w$) from 50,000 to 400,000, said weight percents being based on the total weight of said impact modified, monovinylidene aromatic polymer;

B) from 9 to 90 parts by weight, preferably 15 to 75 parts, of an olefin polymer, selected from the group consisting of homopolymers of ethylene or propylene and copolymers of ethylene with one or more $C_{4-8}$ α-olefins; and C) from 1 to 25 parts by weight, preferably 3 to 20, more preferably 5 to 15 parts, of a compatibilizing polymer comprising a styrene-isoprene-styrene triblock copolymer having a weight average molecular weight of from about 50,000 to about 150,000 wherein the styrene contained in the styrene blocks is from about 25 to 50 weight percent of the total polymer and the sum of A), B) and C) is 100 parts. Preferably, components A), B) and C) exist in the blend as co-continuous phases.

In another embodiment, the invention is a process for preparing a polymeric, thermoformed article, such as sheet or film, which comprises A) contacting a virgin polymer blend described hereinbefore with a recycled polymer blend described hereinbefore, to form a homogeneous blend;

B) forming an article from the combined composition; and

C) recycling scrap material generated during the step of forming the article or subsequent processing steps; wherein the recycled composition contains polymer blend which has been recycled at least five times; and the melt flow rate of the combined composition is within 2.5 grams per 10 minutes, as determined pursuant to ASTM D1238 at 200° C. under a load of 5 kg of the virgin polymer blend.

Such blends are useful in preparing thermoformed articles wherein the unused portion of the blend can be recycled multiple times in the thermoforming process without undue degradation of the compatibilizer which deleteriously affects the properties of the thermoformed articles. Further, polymer blends of the invention containing such recycled blends are processable without untoward increases in elastic modulus and/or decreases in dissipation factor at desired processing temperatures which may result in surface deformations in articles produced from such blends, possibly resulting in poor appearance, and in that they exhibit melt flow rates which facilitate formation of articles from the blends using conventional processing, for example, extrusion.

In a preferred embodiment, the invention is a thermoformable polymer blend that is especially resistant to the solvent effects of halogenated hydrocarbons comprising:

A) from 25 to 70 parts by weight, preferably 30 to 60 parts by weight, most preferably 33.0 to 57 parts by weight, of an impact modified monovinylidene aromatic polymer, comprising from 1 to 25 weight percent of a rubber and 75 to 99 weight percent of a monovinylidene aromatic polymer matrix having a molecular weight ($M_w$) from 50,000 to 400,000, said weight percents being based on the total weight of said impact modified, vinylaromatic polymer;

B) from 15 to 70 parts by weight, preferably 25 to 60 parts by weight, even more preferably 31 to 54 parts by weight, of an olefin polymer as described hereinbefore; and C) from 5 to 25 parts by weight, preferably 5 to 15 parts by weight, of a compatibilizing polymer comprising a styrene-isoprene-styrene triblock copolymer described hereinbefore; components A) and B) or components A), B) and C) existing in said blend as co-continuous phases, and the sum of A), B) and C) being 100 parts.

Further, according to the present invention, there is provided a thermoformable sheet material comprising the foregoing thermoformable polymer blends.

In addition, according to the present invention, there is provided a thermoformed article made by thermoforming the foregoing thermoformable polymer blend.

DESCRIPTION OF FIGURES

FIG. I is a graph of the melt flow rates of two blends, one containing a styrene-isoprene-styrene block copolymer and one containing a styrene-butadiene-styrene block copolymer versus the number of passes through an extruder.

FIG. II is a graph of the Gardner Impact values of two blends, one containing a styrene-isoprene-styrene block copolymer and the other containing a styrene-butadiene-styrene block copolymer versus the number of passes through an extruder.

DETAILED DESCRIPTION OF THE INVENTION

Figure 1:
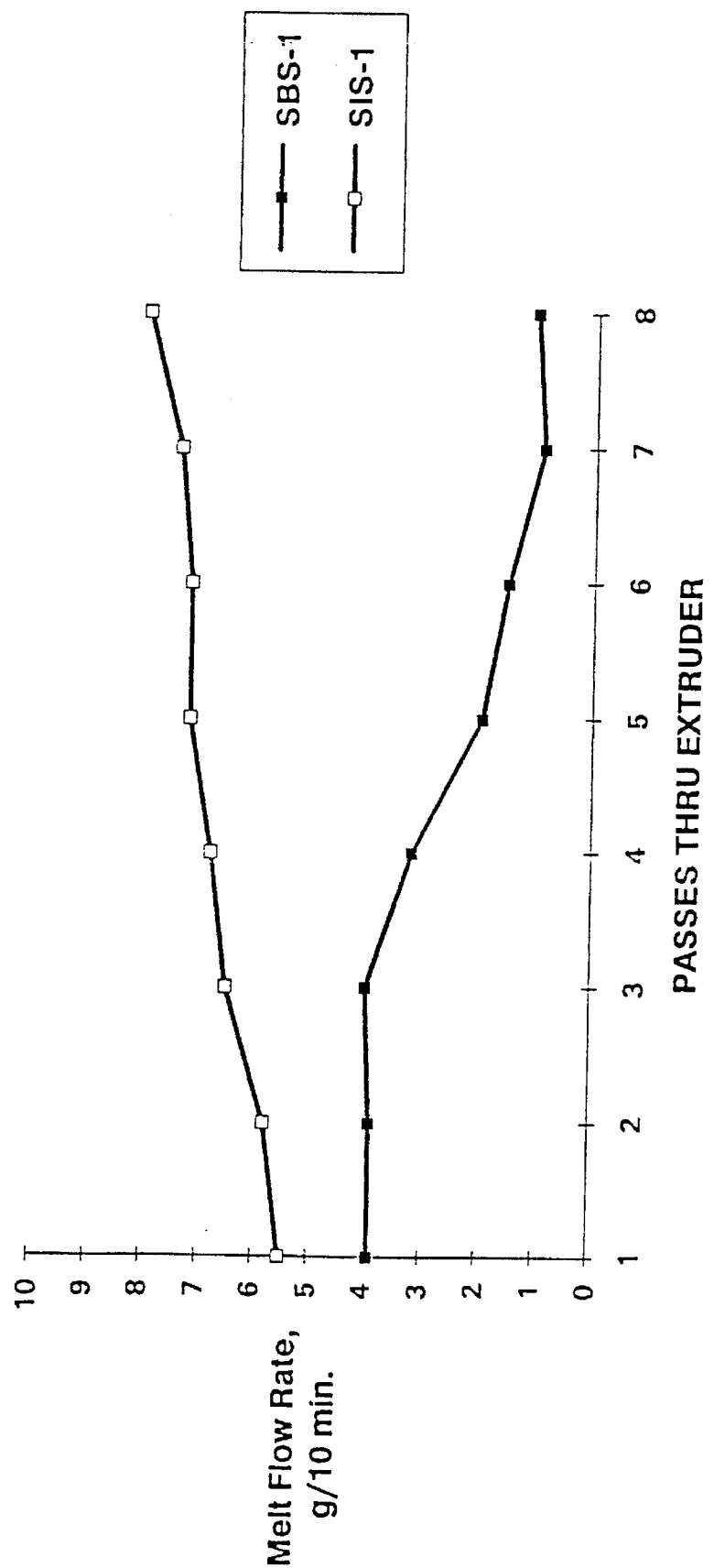

Suitable monovinylidene aromatic polymers comprise polymers containing monovinylidene aromatic monomers which are processable into thermoformed articles. Preferable monovinylidene aromatic polymers include homopolymers of $C_{6-20}$ monovinylidene aromatic monomers, copolymers of two or more such monomers and copolymers of one or more such monomers with up to 25 weight percent of a copolymerizable comonomer other than a monovinylidene aromatic monomer. Examples of preferable monovinylidene aromatic monomers are styrene, vinyl toluene, Q-methylstyrene, t-butyl styrene, chlorostyrene, etc. Examples of preferable copolymerizable comonomers other than a monovinylidene aromatic monomer are N-phenyl maleimide, acrylamide, maleic anhydride, acrylic acid, n-butyl acrylate, methyl methacrylate, etc.

In one embodiment, rubbers having $T_g$ less than 0° C., preferably less than −20° C., are used to modify the impact properties of the foregoing monovinylidene aromatic polymers. Examples of preferable rubbers are homopolymers of $C_{4-6}$ conjugated dienes, especially butadiene or isoprene; copolymers of one or more monovinylidene aromatic monomers and one or more $C_{4-6}$ conjugated dienes, especially butadiene or isoprene; copolymers of ethylene and propylene or ethylene, propylene and a nonconjugated diene, especially 1,6-hexadiene or ethylidene norbornene; homopolymers of $C_{4-6}$ alkyl acrylates; copolymers of $C_{4-6}$ alkyl acrylates and a copolymerizable comonomer, especially a monovinylidene aromatic monomer or a $C_{1-4}$ alkyl methacrylate. Also included are graft polymers of the foregoing rubbery polymers wherein the graft polymer is a monovinylidene aromatic polymer. A preferred monovinylidene aromatic monomer for use in all of the foregoing rubbery polymers is styrene. A most preferred rubbery polymer is polybutadiene or a styrene-butadiene copolymer. The above rubbers may be prepared by anionic solution polymerization techniques or by free radically initiated solution, mass, emulsion or suspension processes. The rubbery elastomers prepared by emulsion polymerization may be agglomerated to produce larger particles having a bimodal or trimodal, etc., particle size distribution if desired.

Monovinylidene aromatic polymers and impact modified monovinylidene impact modified monovinylidene aromatic polymers are well known in the art and are commercially available. Impact modified polymers are prepared by blending the rubbery polymer with previously prepared matrix polymer having the desired chemical composition, by graft polymerizing the matrix in the presence of a predissolved rubber, or by a combination of such techniques.

Preferred impact modified monovinylidene aromatic polymers are prepared by dissolving the rubber in the monomer or monomers, optionally in the presence of a solvent or diluent and polymerizing the resulting solution, desirably while agitating the solution so as to prepare a dispersed, grafted, impact modified polymer, having rubbery domains containing occlusions of matrix polymer dispersed throughout the resulting polymeric matrix. Such rubber modified polymers, known as mass or solution polymerized, high impact polymers, are previously well known in the art and are commercially available. Additional quantities of rubbery polymer, especially emulsion grafted rubbery polymers may be blended into the impact modified monovinylidene aromatic polymer if desired.

A highly preferred monovinylidene aromatic polymer is polystyrene and a highly preferred impact modified polymer is high impact polystyrene. A very highly preferred high impact polystyrenes is prepared by the solution or mass polymerization technique and contains from 5 to 15 (more preferably from 6 to 9) weight percent polybutadiene rubber. Most highly preferred polystyrenes and high impact polystyrenes are those wherein the polystyrene matrix has a weight average molecular weight ($M_w$) from 60,000 to 225,000 (preferably from 100,000 to 225,000 and more preferably from 150,000 to 225.000). When measuring such molecular weights, the technique employed is that of gel permeation chromatography employing a polystyrene standard.

In certain especially preferred embodiments hereof, such as where the described blends are utilized to form a monolayer structure, it has been found to be particularly advantageous to employ high impact polystyrene (HIPS) of a sort which has a broadly distributed range of different sized polystyrene-grafted rubber particles dispersed therein. "Monolayer structure" means a film or sheet comprising a single homogeneous layer of the blend of the invention. Such material may, for example, have a very broad or relatively flat rubber particle size distribution wherein the dispersed rubber particles individually range in size from 0.1 micron to 8 or 10 micron or more and wherein the total amount by weight of rubber contained within such HIPS material is more or less evenly (or randomly) distributed throughout the entire size range indicated. On the other hand, said broad particle size distribution may instead take the form of either a broad monomodal distribution or a multi-modal (for example, bimodal, trimodal, etc.) distribution within the above-noted broad size distribution range.

As is well known, in the case of a typical monomodal distribution, a predominant portion by weight or volume of the dispersed rubber particles are located or concentrated at or around a particular peak size within the above-specified range and the weight or volume percentage of particles contained in the other portions of the entire size range incrementally diminish as one proceeds from said peak particle size toward either end of the overall size range.

As is also well known, multi-modal particle size distributions are typified by two or more distinct peaks being discernible in the overall particle size distribution (that is, when the entire particle population is plotted either by number fraction, weight fraction or volume fraction as a function of size over the entire size range in question).

One particular type or category of HIPS resin of special interest, especially for use in monolayer structures, for use herein are HIPS resins which have a bimodal particle size distribution wherein the majority (for example, from 55 to 95, preferably from 70 to 90 and more preferably from 80 to 90 weight percent) of the dispersed rubber particles have a cellular occlusion morphology and in combination have a volume average particle size (and form a volume-based particle size distribution peak) in the range of from 1.0 to 2.5 micron and wherein a minority of the dispersed rubber particles (for example, from 5 to 45, preferably from 10 to 30 and more preferably from 10 to 20 weight percent) have a substantially solid non-occluded morphology and form a particle size distribution peak or mode in the range of from 3 to 8 micron. Exemplary of this type of high impact polystyrene resin is Styron™ 484 which is available from The Dow Chemical Company.

Another specific category of HIPS resin which is beneficially employed herein, especially in monolayer structures, particularly in the context of inorganic filler-containing (for example, talc-filled) polymer blend systems, is another one which has a bimodal particle size distribution but which has a substantially smaller overall average particle size. In this latter type of HIPS resin, a predominant portion by weight (for example, from 65 to 99, preferably from 70 to 95 and more preferably from 80 to 95 weight percent) of the dispersed rubber particles individually have a particle size in the range of from 0.1 to 0.8 (preferably from 0.2 to 0.6 and more preferably from 0.2 to 0.4) micron and collectively form a volume fraction-based particle size distribution peak within the above-stated size range. The remaining portion (for example, from 1 to 35, preferably from 5 to 30 and more preferably from 5 to 20 weight percent) of the dispersed rubber particles in such HIPS resin individually have particle sizes which are 1 micron or more (but typically less than 10 micron) and collectively form a volume fraction-based size distribution peak in the 1.1 to 8 (preferably 1.2 to 3 and more preferably 1.2 to 2.5) micron size range.

The relatively smaller sized dispersed rubber particles of this latter HIPS resin can have either a single occlusion (that is, polystyrene core and rubber shell) type of particle morphology or can instead be of the multiple occlusion (for example, cellular) variety. However, it will typically be of the single occlusion type, particularly in those instances wherein the volume average size of the indicated small particle fraction is in the 0.1 to 0.6 (especially 0.2 to 0.5) micron size range. On the other hand, the relatively larger size portion of the particular HIPS resin's dispersed rubber particles will typically be of the multiple occlusion/cellular variety. One exemplary HIPS resin of this latter type is available from The Dow Chemical Company as XU-70007.

In one particularly beneficial embodiment of the present invention, both of the above-described types of bimodal HIPS resins are employed in combination with each other to provide what is essentially a trimodal HIPS formulation. When so employed, the resulting formulation can be generally characterized as having a substantial population (for example, from 15 to 92, preferably 25 to 85, more preferably from 30 to 80 and most preferably from 50 to 70 weight percent, on a total rubber content weight basis) of relatively small sized (for example, 0.1 to 0.8 or 1, preferably 0.2 to 0.6 and more preferably 0.2 to 0.4 micron) grafted rubber particles (preferably having a single occlusion structure) in combination with (a) from 5 to 80 (preferably 10 to 70, more preferably from 10 to 60 and most preferably from 20 to 45) weight percent (on a rubber weight basis) of medium sized (for example, from 1.2 to 3 and preferably from 1.2 to 2.5 micron) particles, typically having a cellular morphology, and (b) from 2 to 20 (preferably from 4 to 15 and more preferably from 5 to 10) weight percent of large sized particles in the greater than 3 up to 10 (especially the 4 to 8) micron size range.

When such trimodal HIPS resins are prepared by blending the above-described separate bimodal HIPS resins, the indicated very large grafted rubber particle component will have a relatively dense, non-occluded rubber morphology of the sort which has been noted above. However, as will be readily apparent to those skilled in this art, such large particle grafted rubber component can alternatively be prepared by known, conventional means so as to have a highly occluded cellular morphology or structure.

In those instances wherein it is desired to employ a trimodal HIPS resin ingredient and wherein it is desired to obtain such ingredient by blending or compounding separately prepared bimodal HIPS resins of the types described above, the individual small size/medium size and medium size/large size bimodal HIPS blendstock resins can typically be blended in a 10:90 to 90:10 weight ratio relative to each other but will preferably be blended in a 20:80 to 80:20 (more preferably 25:75 to 75:25 and most preferably 35:65 to 65:35) weight ratio.

Suitable olefin polymers for use herein include high and low density polyethylenes as well as linear low density polyethylene, for example, copolymers of ethylene and one or more $C_{4-8}$ α-olefins. A preferred olefin polymer is high density polyethylene having a density from 0.945 to 0.970, more preferably from 0.955 to 0.965. Such high density polyethylene resins are preferred due to the stiffness which they impart to the final, thermoformable, resin blend. It is preferred that the olefin polymer have a melt viscosity, which is matched or nearly matched to that of the monovinylidene aromatic resin, thereby enabling the resulting blend to achieve thorough melt mixing due to high shear stresses between the components and appropriate phase domain size reduction. Preferred are the use of monovinylidene aromatic polymers and olefin polymers having viscosities at the temperature of blending wherein the ratio of VVA:VOP is from 1:10 to 1:0.05, more preferably from 1:2.0 to 1:0.1. In the foregoing formula, VVA is the vinylidene aromatic polymer melt viscosity and VOP is the olefin polymer melt viscosity. Such melt viscosities are measured by dynamic mechanical spectroscopy at a shear rate of 0.1 $sec^{-1}$. Phase domain size is also affected by the amount of compatibilizing polymer employed.

Phase domain size can be measured by the technique of Computerized Image Analysis as disclosed in Russ, John C., *Computer Assisted Microscopy, the Measurement and Analysis of Images*, Plenum Press, New York, N.Y., (1990). Desirably, the respective domains, that is, the monovinylidene aromatic polymer domain and olefin polymer domain, are continuous, at least in part, in three dimensions, and have a maximum cross-sectional size from 0.1 to 3, preferably 0.2 to 1.0 μm. By the term, "continuous, at least in part", is meant that some or all domains may terminate without spanning the entire article in the direction indicated, however, a substantial quantity of domains, preferably at least 25 percent, extend for a distance of at least 100 times the above maximum cross-sectional area. If substantial amounts of larger domain sizes are present, the monovinylidene aromatic polymer may absorb sufficient solvent, especially hydrochlorofluorocarbons or other blowing agents, that blisters may form under some conditions. That is, sufficient solvent can be absorbed by the monovinylidene aromatic domain such than, upon heating, the trapped solvent volatilizes in sufficient volume to form a void or blister within the polymer, or the solvent otherwise adversely affects the polymeric sheet.

In a further embodiment it is desirable that the crystalline melting point of the olefin polymer be less than the thermoforming temperature of the monovinylidene aromatic polymer. Monovinylidene aromatic polymers are known to be highly amenable to thermoforming due to the fact that such polymers exhibit a melt rheology over a range of temperatures (referred to as the rubbery plateau or thermoforming range) such that the viscous and elastic properties of the melt are properly balanced for good thermoformability. Below such temperature, the polymer melt has an excessive elastic modulus and the polymer retains a "memory" permitting excessive snap-back after forming of the desired thermoformed shape. Above this temperature, the melt possesses insufficient elastic modulus, and parts experience shear thinning during thermoforming. Thus, it is necessary that at the thermoforming temperature of the monovinylidene aromatic polymer, the olefin polymer no longer retains a crystalline structure or otherwise excessively affects thermoforming properties of the monovinylidene aromatic polymer. That is, the crystalline melting point, $T_c$, of the olefin polymer must be less than the thermoforming range of the monovinylidene aromatic polymer. Most particularly, when the resin blend is co-continuous in both components A) and B), the aforementioned thermoforming properties are apparent in the resin blend. If the monovinylidene aromatic polymer is not co-continuous or the continuous phase, satisfactory thermoforming properties are unattainable in large parts, such as refrigerator or freezer liners. Preferably, the thermoforming range of the polymer blend is from 130° C. to 170° C., more preferably from 135° C. to 160° C. In addition, it is desirable that the olefin polymer possess sufficient crystallinity in the blend to produce the desired chemical resistance to the hydrochlorofluorocarbon blowing agents. Preferable olefin polymers for use herein are HDPE 12065 and HDPE 0582N, available from The Dow Chemical Company.

The compatibilizing polymer is a polymer, or mixture of polymers, believed to have the ability to reduce interfacial surface tension between the monovinylidene aromatic polymer and the olefinic polymer. As such, the compatibilizing polymer may be thought of as a polymeric surfactant, having a portion thereof that is compatible with the monovinylidene aromatic polymer and another portion that is compatible with the olefinic polymer. Accordingly, the compatibilizing polymer preferentially resides at the interface between the co-continuous phases. Suitable compatibilizing polymers are readily determined by preparing a blend of components A) and B) and comparing the physical properties, especially the impact resistance and ductility of such blend, with a similar blend containing the compatibilizing polymer. Satisfactory compatibilizing polymers produce an increase in both impact resistance and ductility. Preferably, such increase in both properties is at least 10 percent, more preferably 20 percent. Desirably, such polymers are elastomers, that is, polymers having a $T_g$ less than 0° C., preferably less than −20° C., and having a weight average molecular weight from 10,000 to 150,000, more preferably from 20,000 to 135,000, and most preferably from 50,000 to 120,000 as determined by gel permeation chromatography using a polystyrene standard.

Preferred compatibilizing polymers comprise a styrene-isoprene-styrene triblock copolymer, containing 25 to 50 (preferably 25 to 45, more preferably 30 to 45 and most preferably 40 to 45) weight percent styrene. In one embodiment, the preferred compatibilizer is a styrene-isoprene-styrene block copolymer having a molecular weight (weight average) of from 50,000 to about 150,000 Daltons with a styrene content of from about 25 percent by weight to 50 percent by weight. Optionally, up to about 50 percent by weight of a styrene-butadiene-styrene block copolymer having a weight average molecular weight of from about 50,000 to about 100,000 Daltons and from about 25 to about 50 percent by weight of styrene may be blended with the styrene-isoprene-styrene triblock copolymer. Preferably, the compatibilizer contains 30 percent by weight or less of styrene-butadiene-styrene triblock polymer blended with the styrene-isoprene-styrene triblock copolymer. Most preferably, the compatibilizer contains a styrene-isoprene-styrene block copolymer and does not contain a styrene-butadiene-styrene block copolymer. The presence of too much of the styrene-butadiene-styrene triblock polymer may result in untoward crosslinking which may cause untoward increases in elastic modulus at desired processing temperatures.

Preferably, the styrene-isoprene-styrene triblock copolymer has a weight average molecular weight of about 50,000 Daltons or greater, more preferably about 55,000 Daltons, even more preferably about 60,000 Daltons or greater and most preferably 70,000 Daltons or greater. Preferably, the styrene-isoprene-styrene triblock copolymers have a weight average molecular weight of about 115,000 or less, more preferably 134,000 or less and most preferably about 120,000 or less.

Another preferred block copolymer for use herein is a styrene-isoprene-styrene triblock copolymer which contains from 42 to 65 weight percent styrene and 35 to 58 weight percent isoprene and which has a weight averaged molecular weight ($M_w$) of about 89,000 Daltons and a number average molecular weight ($M_n$) of about 86,000 Daltons. These and other block copolymers suitable for use herein will typically have a fairly narrow molecular weight distribution, with the $M_w:M_n$ ratio thereof typically being in the range of from 1.0 to 1.3 (preferably from 1.0 to 1.2 and more preferably from 1.0 to 1.1).

The polymer blend is prepared by combining the foregoing components and, optionally, additional additives such as colorants, pigments, antioxidants, flow aids, reinforcing agents such as talc, fiberglass, and carbon fibers, nucleators, blowing agents, and lubricants. The mixture is thoroughly melt blended by use of an extruder or similar, intensive mixing device.

In one preferred embodiment, the polymer blend compositions of the present invention further comprise talc as an additional non-polymeric blend ingredient. When so employed, the talc ingredient used typically is one which has a number averaged particle size of from 0.1 to 5 (preferably from 0.1 to 2 and more preferably from 0.1 to 1) micron (based on the averaged or normalized size of the individual, typically irregularly shaped talc particles) and is generally employed in an amount corresponding to from 1 to 20 (preferably from 3 to 15, more preferably from 4 to 12 and most preferably from 5 to 10) weight percent on a total polymer blend composition weight basis. In connection with this particular preferred embodiment, it has also been found to be significantly preferred and advantageous to prepare said talc-filled blend compositions by pre-compounding the talc with at least a portion of the olefin polymer component, as opposed to either pre-compounding same with the impact modified monovinylidene aromatic polymer or directly adding the talc as a free-standing, separate ingredient when melt blending said olefin polymer and aromatic polymer components to form the subject polymer blends. While it is certainly possible, acceptable and within the scope of the present invention to incorporate the talc in either of these latter fashions, it has nonetheless been found that distinctly superior toughness and processing characteristics (for example, extrusion and thermoforming) are obtained for the talc-filled blends in question when the former talc incorporation methodology (that is, either pre-compounding the talc with all of the polyolefin blend component or use of polyolefin-based talc concentrate) is instead employed.

In another preferred embodiment, it has also been found to be advantageous to incorporate certain added thermal stabilizers (that is, beyond those that are conventionally employed in commercial versions of the individual polymer blend ingredients) within the subject polymer blend compositions. Thermal stabilizers which have been found to be particularly beneficial in this regard both individually and especially in combination with each other are hindered phenol stabilizers such as Irganox 1010 and phosphite stabilizers such as trisnonyl phenyl phosphite. The indicated hindered phenol stabilizers are preferably employed in an amount ranging from 0.1 to 0.5 (more preferably from 0.2 to 0.3) weight percent on a total composition weight basis. The phosphite stabilizers, on the other hand, are preferably used in an amount ranging from 0.4 to 1.1 (more preferably from 0.5 to 1.0) weight percent on a total composition weight basis. Most preferably, the indicated phosphite and hindered phenol stabilizers are used in combination with each other, with each of them being used in their above-stated, individual preferred concentration ranges.

In the absence of the compatibilizing polymer, the monovinylidene aromatic polymer and olefinic polymer form segregated domains and the composition demonstrates the worst properties of both polymers, lacking both impact resistance, chemical resistance and thermoformability. However, according to the present invention, the interface between the two phases contains a significant amount of the compatibilizer, permitting interfacial adhesion, giving the blend greater ductility, impact resistance, and environmental stress crack resistance. Also, surface properties, thermoformability and appearance of the blend are greatly improved. Because the compatibilizer is believed to preferably occupy the volume between the domains of the other two polymers, it is possible that some compositions containing component C) can also be thought of as being co-continuous, at least in part.

However, it should be noted that excessive quantities of the compatibilizer may lead to a reduction in resin physical properties, especially tensile modulus. Desirably, the blend exhibits a tensile modulus of at least 200 MPa, more preferably at least 500 MPa.

In processing blends of monovinylidene aromatic polymers and polyolefins compatibilized with styrene-butadiene-styrene block copolymers, it was discovered that as the temperature increased above certain temperatures at certain shear rates and residence times, for instance 220° C. at 0.1 radians per second, the elasticity of the blend began to increase. This increase in elastic modulus creates problems in processing the blends in thermoforming of articles, such as forming sheets or film by extrusion. The increased elasticity increases the susceptibility to melt fracture, which causes a roughened surface on the extruded articles. Nielson, *Polymer Rheology*, Marcel Dekker, Inc. pp. 125–129 (1977) defines melt fracture as flow instabilities that can develop in which toughened surfaces of extruded material are observed. The rate of flow is steady but pulsates. As the tensile stress becomes too great, the melt fractures and the oriented molecules snap back to an unoriented state. Many defects in the surfaces of extruded articles seem to be associated with melt elasticity. It is believed that in prior art formulations, the increase in elasticity is caused by crosslinking of the butadiene portion of the compatibilizing polymer. In extreme cases, the crosslinking results in gel formation and in more extreme cases results in reduction in the properties of the blend as evidenced by melt flow rate variations which are unacceptable. The effect of the crosslinking of the butadiene portion in the compatibilizing polymer of the prior art formulations on the properties of such blend was surprising in that the effect was much greater than expected based on the percentage of compatibilizer contained in the blend and on the small amount of crosslinking, which affects properties of the blends. By using a compatibilizing polymer of styrene-isoprene-styrene or a blend of at least 50 percent by weight of styrene-isoprene-styrene with styrene-butadiene-styrene, the advantage of the presence of a compatibilizing polymer in the blend is retained without the crosslinking which causes the processing problems referred to. As an additional benefit of the use of a compatibilizing polymer of styrene-isoprene-styrene or a blend of at least 50 percent by weight of styrene-isoprene-styrene with styrene-butadiene-styrene, the temperatures at which the blends can be processed is widened, thereby giving the process engineer greater flexibility in processing conditions. It has been discovered that the compatibilizing polymers in the polymer blend may be sensitive to shear and that the crosslinking discussed earlier, along with the co-continuity, exacerbates this sensitivity and the use of a compatibilizing polymer of styrene-isoprene-styrene or a blend of at least 50 percent by weight of styrene-isoprene-styrene with styrene-butadiene-styrene minimizes this effect.

Further, the use of the compatibilizers of this invention allow an added advantage, in that the processing temperature can be reduced and consistent processability can be maintained, whereas this is not possible with styrene-butadiene-styrene based compatibilizers.

It will be readily appreciated by the skilled artisan that additional polymer components may be incorporated into the present blend, if desired, without departing from the scope of the present invention; so long as the desired objectives disclosed herein are not lost.

In order to form articles from the polymer blends of this invention, the polymer blends are subjected to conditions which render them processable. Preferably, the polymer blends are converted to a form such that they have a melt flow rate which is suitable for the processing technique used to form articles from the polymer blends. In the embodiment where films or sheets are formed by extrusion, the polymer blends preferably have a melt flow rate of 0.1 grams per 10 minutes, as determine pursuant to ASTM D1238 at 200° C. under a load of 5 kg or greater, more preferably 1.0 g/10 minutes or greater and most preferably 2.0 g/10 minutes or greater. Preferably, the polymer blends have a melt flow rate of 20 g/10 minutes or less, more preferably 10 g/10 minutes or less and most preferably 6 g/10 minutes or less. Techniques useful for forming articles from the polymer blend of this invention are well known in the art. In one preferred embodiment, the polymer blends, after being processed to achieve a suitable melt flow rate, are extruded or co-extruded into a desired shape, such as a sheen or film. Generally, processing the polymer blends achieve the desired melt flow rate is performed by heating the material to a temperature at which the desired melt flow rate is achieved.

A particularly useful relationship for examining the processability of a polymer composition is the tan delta, also known as the dampening peak or the dissipation factor, which is defined as the ratio of the loss modulus to the storage modulus. Dampening is a very sensitive indicator of the molecular motions occurring in a material in both the solid state and the melt. The dampening peak relates to the increased freedom for small chain segment at the glass transition. Tan delta also exhibits a peak as materials go into the viscous flow region, where molecular entanglement effects become negligible and the only thing impeding flow is frictional forces. The tan delta value is a very good indicator to gauge the balance of melt strength to ability to flow as it is, in it's definition, a ratio of the viscous component to the elastic component. As the tan delta goes up or is higher, the material is more fluid and as the tan delta is lower, the material is more elastic in nature. The tan delta values as a function of temperature at a given shear rate go through the viscous flow region and such values may indicate sensitivity of the polymer blend to temperature and shear rate in processing. Tan delta is well known to those skilled in the art defined and described in L. E. Nielson, *Mechanical Properties of Polymers and Composites Volume 1*, Marcel Dekker, Inc. pp. 139–150 (1974), incorporated herein by reference. Preferably, the tan delta of the polymer blend compositions is 1 or greater at 0.1 radian per second, more preferably 1.5 or greater and most preferably 2.0 or greater. Preferably, the tan delta is 50 or less, more preferably 25 or less and most preferably 10 or less.

In a further desirable feature of the present invention, scrap material resulting from the preparation of the thermoformable sheet or from thermoformed articles, such as edge material which is cut from the sheets or articles, may be readily remelted and included in the thermoplastic blend without adverse effect on polymer properties. In a further embodiment, it may be desirable to improve surface properties of the thermoformable sheet, particularly the gloss of such sheet, by lamination or co-extrusion of a high gloss film to the surface to be ultimately exposed. Suitable high gloss films include extruded polystyrene. These films may be laminated to the thermoformable sheet surface by heat sealing, use of adhesives, or by co-extrusion techniques.

An advantage to the use of the compatibilizing polymers of this invention is that the addition of untoward amounts of stabilizers is not required to prevent the degradation of the properties of a polymer blend containing recycled materials.

Virgin composition, as used herein, refers to a blend as described and claimed herein which has not been used previously in a thermoforming process, such as forming a sheet or film by an extrusion process.

Recycled composition, as used herein, refers to a blend as described and claimed herein which has been used previously in a thermoforming process, such as forming a sheet or film.

Scrap, as used herein, refers to material derived from the blends of the invention which have been subjected to thermoforming processes, such as sheet or film extrusion or subsequent processes, and which are not incorporated into the final product, i.e., sheet or film or derivative thereof.

Film, as used herein, means a coherent polymer layer having a preferable thickness of 0.006 mm or greater, preferably 0.013 mm or greater, even more preferably 0.018 mm or greater and more preferably 0.025 mm or greater, and preferably a thickness of 0.64 mm or less, more preferably a thickness of 0.51 mm or less and most preferably a thickness of 0.31 mm or less.

Sheet, as used herein, refers to a coherent polymer layer formed from the blends of this invention, preferably having a thickness of 0.63 mm or more, more preferably 1.27 mm or more, and most preferably 1.90 mm or more and preferably having a thickness of 6.4 mm or less, more preferably 5.7 mm or less and most preferably 5.0 mm or less.

The term "contains material recycled at least five times" means the combined blend or recycled blend has blend in the mixture which has been subjected to a thermoforming or extrusion process as described herein at least five times. As scrap is incorporated into the combined blend, some of the scrap will have been previously recycled, some of it at least five times.

The scrap from the process of forming an article or subsequent processing is recycled and combined with virgin polymer blend to prepare a combined polymer blend composition. The combined polymer blend composition is useful in forming articles according to the process of this invention. The amount of recycled scrap polymer blend which may be incorporated into the combined polymer blend composition is than amount which does not negatively affect the processability of the combined polymer blend or deleteriously affect the properties of the final article. Preferably, the melt flow rate of the combined composition is within about 2.5 g/10 minutes of the melt flow rate of the virgin polymer blend composition. More preferably the melt flow rate of the combined polymer blend composition is within 2.0 g/10 minutes of the melt flow rate of the virgin polymer blend. Preferably, the combined polymer blend comprises 100 percent by weight or less of the recycled scrap polymer blend, more preferably 75 percent by weight or less and most preferably 50 percent by weight or less. Preferably, the combined polymer blend comprises 1 percent by weight or more of the recycled scrap polymer blend, more preferably 5 percent by weight or more and most preferably 10 percent by weight or more. Preferably, the polymer blends of this invention are capable of being recycled from the article formation processes at least five times and, preferably, seven times, without deleteriously affecting the properties of the formed articles.

In one embodiment, the recycled scrap polymer blend is combined with virgin polymer blend. The combined polymer blend can then be subjected to the forming process. In this embodiment, a portion of the polymer blend can contain material which has been recycled multiple times. In order for the combined polymer blend to be processable, the portion which has been recycled several times must not negatively affect the properties of the blend or articles formed.

In another embodiment, the scrap may be recycled as feed in the absence of virgin polymer blend. In such embodiment, the recycled scrap is the feed to the article formation process.

In the embodiment wherein the polymer blend contains recycled scrap, the scrap from previous forming steps or subsequent steps is contacted with virgin polymer blend. The contacting can take place using standard techniques.

The virgin polymer blend and scrap can be contacted and thereafter heated to the temperature at which they are molten and, alternatively, the scrap and virgin polymer blends may be individually heated to temperatures at which they are molten and the molten polymer blends can then be contacted.

The polymer blends of this invention can be processed under conditions which do not deleteriously affect the properties of the articles prepared from them. The blends are sensitive to the particular conditions used and the type of equipment used to process the blends. A particularly advantageous type of processing apparatus is an extruder equipped with a conventional single flighted single screw with a feed section and compression section of at least 6 flights. Preferably, the apparatus has flow passages which are designed to avoid having the blend get hung up in corners or sharp bends, has gentle compression sections and does not subject the blends to high shear. Preferably the die has a coat hanger design. The blends of the invention are sensitive to shear, temperature and residence time in processing equipment. Generally, increases in shear rate, residence time and/or temperature may negatively affect the processability of the blends and products prepared from them. Preferably, the polymer blends are processable at a temperature of 170° C. or greater, more preferably 180° C. or greater and most preferably 190° C. or greater. The upper limit on the temperature to which the blends can be heated is that temperature at which the melt flow rate is too high to process the blend or the temperature at which the stability of the polymers in the blend is deleteriously affected. Preferably the blend is processable at a temperature of 250° C. or less, more preferably 235° C. or less and most preferably at 220° C. or less. Preferably the residence time in the processing apparatus is from about 15 seconds to about 4 minutes. Preferably the blends are processable at a shear rate produced by a typical single-screw extruder running at 5 revolutions per minute (RPM) or greater, more preferably 10 RPM or greater and most preferably 15 RPM or greater. Preferably, the blends are processable at a shear rate exerted at 400 revolutions per minute (RPM) or less, more preferably 300 RPM or less and most preferably 250 RPM or less. The parameters for processing discussed generally apply to equipment meeting the conditions described above and adjustments may need to be made for other equipment. A skilled process engineer is capable of adjusting the processing parameters of the blend based on the equipment used. Selection of the most extreme conditions described may result in less processability due to the sensitivity of the blend.

The polymer blends may be formed into films using standard processing techniques. Such standard techniques are described in the *Encyclopedia of Polymer Science and Engineering*, Mark et al., Ed. 2nd edition, Volume 7, pp. 88–106, incorporated herein by reference.

Thermoformable sheets of the thermoplastic blend of the present invention are readily prepared utilizing techniques well known in the prior art. Suitably, the molten polymer blend prepared according to the previously described melt blending process, or prepared by re-melting and re-extruding pellets thereof, is forced through a die to form a thin sheet. The sheet is subsequently passed through a thermoforming process (optionally after reheating if the sheet has been cooled below the thermoforming temperature) wherein the desired shape is pressed into the hot, nearly molten sheet. A desirable temperature range for thermoforming is from 130° C. to 170° C. Suitable thermoforming techniques are well known to the skilled artisan and disclosed, for example, in the *Encyclopedia of Polymer Science and Engineering*, 2nd Ed., Wiley-Interscience, Vol. 16, 807–832 (1989).

Although the thermoformed articles prepared from the polymer blends according to the present invention may be employed in any application, such as in containers, toys, furniture, automotive components, ice chests and coolers, they are desirably employed in the preparation of refrigerators and freezers. More particularly, the present, one-piece thermoformed article is utilized as a refrigerator or freezer liner to form the inner surface of the door or body of the refrigerator or freezer.

Having described the invention, the following examples are provided as further illustrative and are not to be construed as limiting. Unless stated to the contrary, all parts and percentages are based on weight.

EXAMPLES 1–4

Various blends of two different high impact polystyrene resins (Styron™ 484 and XU-70007 and mixtures thereof) with high density polyethylene (HDPE 12065) and a styrene-isoprene-styrene triblock copolymer (42–44 weight percent styrene and 56 to 58 weight percent isoprene; $M_w$=89,000 and $M_n$=86,000) having 10 weight percent talc incorporated therein were prepared by conventional melt blending techniques in a Welding Engineers twin screw extruder operating to produce a melt temperature of 220° C. Samples were then extruded at about 210° C. into 100-mil thick sheet using a Davis-Standard sheet extrusion line.

Test specimens were prepared from each of the resulting polymer blends and were subjected to physical property testing. The physical properties of the resulting blends are set forth in Table 1 below.

TABLE 1

| Blend Components (wt. percent) | Example Number | | | |
|---|---|---|---|---|
| | 1 | 2 | 3 | 4 |
| HIPS-1 (Styron™ 484) | 49.2 | 36.9 | 24.6 | 12.3 |
| HIPS-2 (XU 70007) | 0 | 12.3 | 24.6 | 36.9 |
| HDPE | 29.8 | 29.8 | 29.8 | 29.8 |
| SIS | 10 | 10 | 10 | 10 |
| Talc | 10 | 10 | 10 | 10 |
| Hindered Phenol Stabilizer | 0.25 | 0.25 | 0.25 | 0.25 |
| Phosphite Stabilizer | 0.75 | 0.75 | 0.75 | 0.75 |
| Flex Fatigue[1] number of blends | 3.1 | 4 | 5.1 | 6 |
| Notched Izod[2] (T.D.*) | 2.1 (112) | 2.4 (128) | 2.5 (134) | 2.7 (144) |
| Notched Izod[2] (M.D.**) | 4.0 (214) | 4.4 (235) | 4.6 (246) | 4.9 (262) |
| Tensile Modulus[3] (T.D.) | 133 (917) | 150 (1,034) | 160 (1,103) | 167 (1,152) |
| Flex Modulus[4] (T.D.) | 164 (1,131) | 164 (1,131) | 176 (1,214) | 189 (1,303) |
| Dynatup PE[5] | 102 (11.5) | 131 (14.8) | 106 (12.0) | 119 (13.4) |
| Ductility Index[6] | 9 (1.0) | 10 (1.1) | 15 (1.7) | 33 (3.7) |

TABLE 1-continued

| Blend Components (wt. percent) | Example Number | | | |
|---|---|---|---|---|
| | 1 | 2 | 3 | 4 |

*T.D. means Transverse direction. Sample is cut from sheet in the direction transverse to the direction of extrusion.
**M.D. means machine direction. Sample is cut in the direction of extrusion.
[1]Flex Fatigue Test - A 100-mil thick, ½-inch wide transverse cut sample is bent 180° and pushed flat as a first bend. Next the sample is bent 360° and again pushed flat as a second bend. The 360° bends are then continued (being pushed flat in each instance) until failure occurs. The test is then repeated to obtain a sample population of 21 data points from which a mean value is calculated.
[2]ASTM D256 using a 0.91 Ka nammer in ft. lbs./in. (J/m).
[3]ASTM D638 at 0.51 cm/min. rate in 1,000 psi units (MPa).
[4]ASTM D790 at 0.13 cm/min. rate. Units are 1,000 psi (MPa)
[5]Instrumented Dart Impact Testing is done pursuant to ASTM D3763 using a Dynatup instrument with a 52 lb. weight and a dart diameter of 0.5 in. (1.27 cm) and using a 2-square-inch (25.8 cm$^2$) plaque sample and an impact speed of 8.000 inches/minute. Peak Energy (PE) then equals the energy at maximum load (i.e., the area under the load displacement curve at maximum load). Units are in. lb. (J). Total Energy (TE) equals the area under the total load displacement curve. Units are in. lb. (J).
[6]Ductility Index = Dynatup TE minus Dynatup PE. Units are in. lb. (J).

As can be seen from the results in Table 1, the talc-filled polymer blend compositions hereof become increasingly tougher as the proportion of the smaller particle sized HIPS resin (that is, XU-70007) is increased relative to that of its larger rubber particle-containing counterpart (that is, Styron™ 484). It thus appears that improved toughness in talc-containing versions of the subject polymer blends is substantially improved by increasing the proportion (or population) of very small (for example, 0.2 to 0.6 micron) grafted rubber particles contained within such talc-filled blends.

EXAMPLES 5–8

In this series of examples, three different talc-filled polymer blends were prepared which had identical overall compositional make-up but which were prepared using different methods of incorporating the talc ingredient.

In one of the blends (Example 5) the talc was introduced to the compounding extruder as a concentrate in a HIPS carrier resin, whereas in Example 6 it was directly added (that is, without being pre-compounded) and in Example 7 in was added in the form of a HDPE-based concentrate.

In addition, a fourth blend was also prepared (Example 8) which contained the same relative ratios of the same polymer ingredients but which did not contain the talc ingredient.

The physical properties obtained for the various blends prepared in the above-noted fashions are summarized in Table 2.

TABLE 2

| Blend Components (wt. percent) | Example Number | | | |
|---|---|---|---|---|
| | 5 | 6 | 7 | 8 |
| HIPS-1 (Styron™ 484) | 24.6 | 24.6 | 24.6 | 27.4 |
| HIPS-2 (XU-70007) | 24.6 | 24.6 | 24.6 | 27.4 |
| HDPE | 29.8 | 29.8 | 29.8 | 33.2 |
| SIS | 10 | 10 | 10 | 11.25 |
| Hindered Phenol | 0.25 | 0.25 | 0.25 | 0.25 |

TABLE 2-continued

| Blend Components (wt. percent) | Example Number | | | |
|---|---|---|---|---|
| | 5 | 6 | 7 | 8 |
| Stabilizer Phosphite Stabilizer | 0.75 | 0.75 | 0.75 | 0.75 |
| Talc Content | 10 | 10 | 10 | 0 |
| Talc Addition Method | HIPS Concentrate | Direct Add | Polyethylene Concentrate | |
| Properties | | | | |
| Notched Izod (T.D.) | 2.02 (108) | 2.17 (116) | 2.42 (129) | 2.3 (123) |
| Notched Izod (M.D.) | 3.55 (190) | 3.76 (201) | 4.50 (241) | 5.3 (283) |
| Percent Elongation at Break (T.D.) | 12 | 8.3 | 17 | 34 |
| Percent Elongation at Break (M.D.) | 93 | 100 | 116 | 180 |
| Flex Modulus (T.D.) | 210 (1,448) | 165 (1,138) | 182 (1,255) | 134 (924) |
| Flex Modulus (M.D.) | 252 (1,738) | 230 (1,586) | 237 (1,634) | 202 (1,395) |

As can be seen from the results in Table 2, the blend prepared using a polyethylene-based talc concentrate (that is, Example 7) exhibits notably better notched Izod impact strength values than those obtained when the talc is either added directly to the melt compounding operation or added in the form of a HIPS resin-based concentrate. As can also be seen, the talc ingredient, regardless of how it is added, serves to substantially increase the modulus of the resulting polymer composition.

EXAMPLES 9–23

Table 3 lists the styrene block copolymers used in Examples 9–23. SBS-1 is a tapered, multiblock styrene-butadiene copolymer. SBS-2 is a pure block, styrene-butadiene-styrene triblock copolymer. SIS-1 and SIS-2 are pure block styrene-isoprene-styrene triblock copolymers.

The polystyrene resin is high impact polystyrene (HIPS) STYRON™ 484 polystyrene available from The Dow Chemical Company. It is characterized by a melt flow rate of 3.0 g/10 minutes (Condition G 200/5), a notched izod impact of 133 J/m, a deflection temperature under load (DTUL) at 1.82 MPa (unannealed) of 76° C., a vicar softening point of 100° C. and a density of 1.05 g/cc.

The polyolefin resin is a high density polyethylene (HDPE) HDPE 12165 available from The Dow Chemical Company. It is characterized by a melt flow rate of 0.9 g/10 minutes (Condition E 190/2.16), a notched izod impact of 342 J/m, a DTUL at 1.82 MPa (unannealed) of 49° C., a vicar softening point of 128° C., and a density of 0.965 g/cc. All materials are commercially available and were used as received from the manufacturer. Table 3 lists the composition of each blend product tested.

TABLE 3

| | Styrenic Block Copolymers | | | |
|---|---|---|---|---|
| Properties | SBS-1 | SBS-2 | SIS-1 | SIS-2 |
| Styrene, % | 43 | 42 | 43 | 3 |
| Melt Flow Rate, g/10 min.* | 12 | 23 | 35 | 14 |
| Shore A | 85 | 88 | 38 | 60 |
| Tensile, MPa | 15 | 31 | 26 | 30 |
| 300% Modulus, MPa | 3.1 | 8.9 | 7.9 | 4.7 |
| 100% Modulus, MPa | 2.4 | 5.6 | 5.5 | 3.2 |
| Elongation, % | 1075 | 750 | 985 | 1100 |

*Condition G (200/5)

Each blend was extrusion melt blended on a Werner Pfleiderer ZSK-30 twin-screw laboratory extruder. The product was strand pelletized with a Conair Jetro pelletizer. Subsequent to compounding, each product was injection molded on a Mannesman Demag 100 ton molder equipped with a seven-cavity, ASTM-specified family mold. The general extrusion and injection molding conditions are shown in Table 4.

TABLE 4

| Extrusion Compounding/Injection Molding Conditions | | |
|---|---|---|
| Property | Extrusion | Injection |
| Zone 1, °C. | 140 | 160 |
| Zone 2, °C. | 160 | 175 |
| Zone 3, °C. | 170 | 175 |
| Zone 4, °C. | 180 | 175 |
| Die, °C. | 190 | 175 |
| Melt Temp., °C. | 200–205 | 210–230 |
| Screw Speed, RPMS | 200 | 120 |
| Torque, % | 75–85 | NA |
| Injection Speed, sec. | NA | 1.4 |
| Pressure, MPa | 5.2–14.5* | 4.7–12.4** |
| Cycle Time, sec. | NA | 45 |
| Rate, kg./hr. | 14 | NA |
| Mold Temp., °C. | NA | 45 |

*Die
**Hydraulic

Properties of the formed products measured included melt flow rate, notched izod impact at 23° C. and 0° C., flexural modulus, elongation an break, Gardner impact, and deflection temperature. The properties are compiled in Table 5.

TABLE 5

| Blend Components (wt. percent) | Example 9 | Example 10 | Example 11 | Example 12 | Example 13 | Example 14 | Example 15 |
|---|---|---|---|---|---|---|---|
| HIPS (Styron 484) | 64.3 | 58.0 | 58.0 | 58.0 | 58.0 | 83.7 | 83.7 |
| HDPE (12065) | 35.7 | 32.3 | 32.3 | 32.3 | 32.3 | 9.3 | 9.3 |
| SBS-1 | 0 | 9.7 | 0 | 0 | 0 | 7.0 | 0 |
| SBS-2 | 0 | 0 | 9.7 | 0 | 0 | 0 | 7.0 |
| SIS-1 | 0 | 0 | 0 | 9.7 | 0 | 0 | 0 |
| SIS-2 | 0 | 0 | 0 | 0 | 9.7 | 0 | 0 |

TABLE 5-continued

| | | | | | | | |
|---|---|---|---|---|---|---|---|
| TOTAL % | 100 | 100 | 100 | 100 | 100 | 100 | 100 |
| Properties | | | | | | | |
| Notched Izod @ 23° C. (1) | 0.4 (21) | 2.4 (128) | 2.7 (146) | 3.0 (160) | 3.3 (176) | 2.9 (155) | 2.8 (149) |
| Notched Izod @ 0° C. (1) | 0.3 (16) | 1.5 (81) | 2.1 (112) | 1.8 (96) | 1.8 (96) | 1.5 (80) | 1.6 (85) |
| Gardner Impact (2) | 1 (0.1) | 195 (22.0) | 304 (34.4) | 368 (41.6) | 237 (26.8) | 153 (17.3) | 387 (43.7) |
| Deflection Temperature @ 264 psi (3) | 161.4 | 152 | 154.7 | 151.5 | 152.1 | 161.4 | 170.5 |
| Melt Flow Rate (4) | 4.2 | 4.2 | 4.9 | 6.0 | 6.0 | 3.5 | 3.9 |
| Flex Modulus (5) | 190 (1,310) | 134 (923) | 141 (972) | 145 (1,000) | 122 (841) | 221 (1,523) | 224 (1,544) |
| Elongation at Break (6) | 4.4 | 45 | 70 | 77 | 88 | 48 | 66 |

| Blend Components (wt. percent) | Example 16 | Example 17 | Example 18 | Example 19 | Example 20 | Example 21 |
|---|---|---|---|---|---|---|
| HIPS (Styron 484) | 83.7 | 83.7 | 13.3 | 13.3 | 13.3 | 13.3 |
| HDPE (12065) | 9.3 | 9.3 | 66.7 | 66.7 | 66.7 | 66.7 |
| SBS-1 | 0 | 0 | 20 | 0 | 0 | 0 |
| SBS-2 | 0 | 0 | 0 | 20 | 0 | 0 |
| SIS-1 | 7.0 | 0 | 0 | 0 | 20 | 0 |
| SIS-2 | 0 | 7.0 | 0 | 0 | 0 | 20 |
| TOTAL % | 100 | 100 | 100 | 100 | 100 | 100 |
| Properties | | | | | | |
| Notched Izod @ 23° C. (1) | 2.7 (144) | 2.9 (155) | 15.0 (800) | 16.7 (891) | 16.0 (854) | 14.8 (790) |
| Notched Izod @ 0° C. (1) | 1.3 (69) | 1.6 (85) | 20.8 (1,110) | 18.6 (992) | 17.0 (907) | 21.0 (1,120) |
| Gardner Impact (2) | 304 (34.4) | 303 (34.4) | 304 (34.4) | 413 (46.7) | 400 (45.2) | 240 (27.1) |
| Deflection Temperature @ 264 psi (3) | 165.3 | 162.1 | 120.3 | 121.4 | 123.8 | 115.1 |
| Melt Flow Rate (4) | 4.4 | 4.4 | 5 | 5.5 | 6.5 | 6.5 |
| Flex Modulus (5) | 224 (1,544) | 205 (1,413) | 66 (455) | 76 (524) | 69 (475) | 68 (469) |
| Elongation at Break (6) | 67 | 55 | 737 | 465 | 681 | 721 |

(1) ASTM D256 - ft. lbs./in. (J/m)
(2) ASTM D3029 - in.-lb. (J)
(3) ASTM D648 - degree centigrade
(4) ASTM D1238 - 200 degree centigrade/5 kg - g/10 min.
(5) ASTM D790 - Units are 1,000 psi (MPa)
(6) ASTM D638 - Units are percent EXAMPLES 24 and 25

The physical properties of a blend of high impact polystyrene, high density polyethylene and styrene block copolymer (HIPS/HDPE/SBC) (70/20/10 weight percent) containing SBS-1 were compared to a similar blend with SIS-1 in a regrind study. The study was conducted as follows: a 45 kg sample was extrusion compounded, an approximately 5 kg sample was collected, the remaining approximately 40 kg of product was extrusion compounded again and a second approximately 5 kg sample collected. This was repeated until eight samples, each having been successively passed through the extruder an additional time, were collected. Subsequently, each sample was injection molded and their physical properties tested. FIG. I is a graph of the melt flow rates of a blend containing SBS-1 and SIS-1 after each pass through the extruder. FIG. II shows a blend containing SBS-1 demonstrates an increasingly lower melt flow rate with each successive pass through the extruder. Blends containing SIS-1 show an increase in melt flow rate with each successive pass through the extruder. FIG. II is a graph of the Gardner impact values of blends containing SBS-1 and SIS-1 measured after each pass through the extruder. Blends containing SIS-1 demonstrate higher Gardner impact values than blends containing SBS-1 after each successive pass through the extruder.

EXAMPLES 26 and 27

Blown film was produced from pellets of a blend as described in Table 6 using a Killion machine with a single-screw extruder operated at 70 RPM's with a 24:1 L/D (length/width), 25.4 mm screw, and a 31.75 mm (ring Size) cross-head tube die with a 0.864 mm die gap. The take-off tower was approximately 305 cm high. Temperatures were 175° C. to 205° C. and layflat was approximately 152 mm.

Case film was produced from pellets of a blend as described in Table 6 using a Killion machine with a single-screw extruder operated at 70 RPM's with a 24:1 L/D (length/width), 25.4 mm screw, a 25.4 cm die width and a 1.02 mm die gap. Temperatures were 160° C. to 221° C. and the cast roll temperature was 22.3° C. Properties of the films are compiled in Table 6.

TABLE 6

| Blend Components | Example Number | | | |
|---|---|---|---|---|
| (weight percent) | 22 | 23 | 24 | 25 |
| LDPE (6811) | 66.7 | 66.7 | 66.7 | 66.7 |
| Crystal PS (STYRON ™ 685) | 19.0 | 19.0 | 19.0 | 19.0 |
| SBS-1 | 9.5 | 0 | 9.5 | 0 |
| SIS-1 | 0 | 9.5 | 0 | 9.5 |
| Erucamide (Slip Agent) | 4.8 | 4.8 | 4.8 | 4.8 |
| TOTAL % | 100 | 100 | 100 | 100 |
| Fabrication Method | Blown | Blown | Cast | Cast |
| Gauge, mils | 1.5 | 1.6 | 2.0 | 2.3 |
| BUR (Blw-Up Ratio) | 3.1 | 3.1 | NA | NA |
| DDR (Draw Down Ratio) | 6.9 | 6.5 | 20 | 17.4 |
| Properties | | | | |
| Ultimate Tensile (MD) (1) | 2384 (16.4) | 2682 (18.5) | 3199 (22.1) | 2913 (20.1) |
| Ultimate Tensile (TD) (1) | 1905 (13.1) | 2506 (17.3) | 1459 (10.0) | 1498 (10.3) |
| Elongation (MD) (2) | 142 | 150 | 125 | 117 |
| Elongation (TD) (2) | 283 | 375 | 75 | 275 |

(1) ASTM D412 - Units are psi (MPa)
(2) ASTM D412 - Units are percent (%)

What is claimed is:

1. A process for thermoformed article which comprises:

A) contacting a virgin polymer blend with a recycled polymer blend to form a homogeneous blend wherein the polymer blends independently comprise (1) from 9 to 90 parts by weight of (a) a monovinylidene aromatic polymer having a molecular weight ($M_w$) from 50,000 to 400,000 or (b) an impact modified monovinylidene aromatic polymer comprising from 1 to 25 weight percent of a rubber and 75 to 99 weight. percent of a monovinylidene aromatic polymer matrix having a weight average molecular weight ($M_w$) from 50,000 to 400,000, said weight percents being based on the total weight of said impact modified, monovinylidene aromatic polymer; (2) from 9 to 90 parts by weight of an olefin polymer, selected from the group consisting of homopolymers of ethylene and copolymers of ethylene with one or more $C_{4-8}$ α-olefins; and (3) from 1 to 25 parts by weight of a compatibilizing polymer comprising a styrene-isoprene-styrene triblock copolymer having a weight average molecular weight of from about 50,000 to about 150,000, wherein the styrene contained in the styrene blocks is from about 25 to 50 weight percent of the total polymer; and the sum of A), B) and C) is 100 parts;

B) forming an article from the combined composition; and

C) recycling scrap material generated during the step of forming an article or subsequent processing steps;

wherein the recycled composition contains polymer which has been recycled at least five times; and the melt flow rate of the combined composition is within 2.5 grams per 10 minutes, as determined pursuant to ASTM D1238 at 200° C. under a load of 5 kg, of the virgin polymer blend.

2. The process of claim 1 wherein the combined composition is heated to a temperature at which the composition has a melt flow rate of from about 0.1 to 20.0 g/100 minutes at 200° C./5 kg and the article is formed by extrusion.

3. The process according to claim 2 wherein a sheet is formed.

4. The process according to claim 2 wherein the melt flow rate of the combined composition is within 2.0 grams per 10 minutes, as determine pursuant to ASTM D1238 at 200° C. under a load of 5 kg of the melt flow rate of the virgin composition.

5. The process of claim 3 wherein component C) of the virgin polymer blend, the recycled composition or both may further comprise up to about 50 percent by weight of a styrene-butadiene-styrene block copolymer having a weight average molecular weight of from about 50,000 Daltons to about 100,000 Daltons and a styrene content of from about 25 weight percent to 50 weight percent.

6. The process of claim 2 wherein component C) of the virgin composition, the recycled composition or both may further comprise up to about 30 percent by weight of a styrene-butadiene-styrene block copolymer having a weight average molecular weight of from about 50,000 Daltons to about 100,000 Daltons and a styrene content of from about 25 weight percent to 50 weight percent.

7. The process of claim 2 wherein the combined composition is heated to a temperature of about 170° C. to about 250° C.

8. The process of claim 2 wherein a film is prepared.

9. The process of claim 3 which further comprises thermoforming the sheet into a desired shape, removing unwanted polymeric scrap and recycling the polymeric scrap material.

10. A process for preparing a thermoformed article which comprises:

A) forming an article from a recycled composition comprising (1) from 9 to 90 parts by weight of (a) a monovinylidene aromatic polymer having a weight average molecular weight ($m_w$) from 50,000 to 400,000 or (b) an impact modified monovinylidene aromatic polymer comprising from 1 to 25 weight percent of a rubber and 75 to 99 weight percent of a monovinylidene aromatic polymer matrix having a weight average molecular weight ($M_w$) from 50,000 to 400,000, said impact modified, monovinylidene aromatic polymer; (2) from 9 to 90 parts by weight of an olefin polymer, selected form the group consisting of homopolymers of ethylene and copolymers of ethylene with one or more $C_{4-8}$ α-olefins; and (3) from 1 to 25 parts by weight of a compatibilizing polymer comprising a styrene-isoprene-styrene triblock copolymer having a weight average molecular weight of from about 50,000 to about 150,000, wherein the styrene contained in the styrene blocks is from about 25 to 50 weight percent of the total polymer; and the sum of A), B) and C) is 100 parts; and B) recycling scrap material generated during the step of forming the article or subsequent processing steps;

wherein the recycled composition contains polymer which has been recycled at least five times; and the melt flow rate of the combined composition is within 2.5 grams per 10 minutes, as determined.

11. The process of claim 10 wherein the recycled composition is heated to a temperature at which the composition has a melt flow rate of from about 0.1 to 20.0 g/100 minutes at 200° C./5 kg and the article is formed by extrusion.

12. The process according to claim 11 wherein a sheet is formed.

13. The process of claim 12 which further comprises thermoforming the sheet into a desired shape.

14. The process according to claim 11 wherein the melt flow rate of the combined composition is within 2.0 grams per 10 minutes, as determined pursuant to ASTM D1238 at 200° C. under a load of 5 kg of the melt flow rate of the virgin composition.

15. The process of claim 12 wherein component C) of the virgin polymer blend, the recycled composition, or both may further comprise up to about 50 percent by weight of a styrene-butadiene-styrene block copolymer having a weight average molecular weight of from about 50,000 Daltons to about 100,000 Daltons and a styrene content of from about 25 weight percent to about 50 weight percent.

16. The process of claim 11 wherein component C) of the recycled composition may further comprise up to about 30 percent by weight of a styrene-butadiene-styrene block copolymer having a weight average molecular weight of from about 50,000 Daltons to about 100,000 Daltons and a styrene content of from about 25 weight percent to 50 weight percent.

17. The process of claim 11 wherein a film is prepared.

18. The process of claim 11 wherein the recycled composition is heated to a temperature of about 170° C. to about 250° C.

* * * * *